(12) United States Patent
Greaney (10) Patent No.: US 12,315,086 B2
(45) Date of Patent: May 27, 2025

(54) AUGMENTED REALITY DECORATING SYSTEM

(71) Applicant: Jacqueline M. Greaney, Middleton, WI (US)

(72) Inventor: Jacqueline M. Greaney, Middleton, WI (US)

( * ) Notice: Subject to any disclaimer, the term of this patent is extended or adjusted under 35 U.S.C. 154(b) by 0 days.

(21) Appl. No.: 17/738,741

(22) Filed: May 6, 2022

(65) Prior Publication Data

US 2023/0360332 A1    Nov. 9, 2023

(51) Int. Cl.
| | | |
|---|---|---|
| *G06T 19/00* | (2011.01) | |
| *G06F 3/04815* | (2022.01) | |
| *G06F 3/04842* | (2022.01) | |
| *G06Q 30/0601* | (2023.01) | |

(52) U.S. Cl.
CPC ........ *G06T 19/006* (2013.01); *G06F 3/04815* (2013.01); *G06Q 30/0643* (2013.01); *G06F 3/04842* (2013.01); *G06T 2200/24* (2013.01); *G06T 2210/04* (2013.01)

(58) Field of Classification Search
None
See application file for complete search history.

(56) References Cited

U.S. PATENT DOCUMENTS

| | | | |
|---|---|---|---|
| 8,989,440 B2 * | 3/2015 | Klusza | G06F 30/13 |
| | | | 382/103 |
| 10,937,247 B1 * | 3/2021 | Chuah | G06T 7/70 |
| 11,263,457 B2 * | 3/2022 | Rom | G06V 10/462 |
| 2002/0093538 A1 * | 7/2002 | Carlin | G06Q 30/02 |
| | | | 715/778 |
| 2007/0143082 A1 * | 6/2007 | Degnan | G06T 11/60 |
| | | | 703/1 |
| 2015/0325038 A1 * | 11/2015 | Baker | G06T 15/50 |
| | | | 345/426 |
| 2017/0228809 A1 * | 8/2017 | Yalniz et al. | |
| 2018/0374276 A1 * | 12/2018 | Powers | |
| 2019/0251753 A1 * | 8/2019 | Canada | G06T 11/60 |
| 2020/0258144 A1 * | 8/2020 | Chaturvedi | G06T 7/50 |
| 2020/0302681 A1 * | 9/2020 | Totty | G06T 7/74 |
| 2021/0209862 A1 * | 7/2021 | Seva et al. | |
| 2022/0358734 A1 * | 11/2022 | Schuster | G06T 19/006 |
| 2023/0260202 A1 * | 8/2023 | Maschmeyer | G06T 15/205 |
| | | | 345/419 |

* cited by examiner

*Primary Examiner* — Edward Martello
(74) *Attorney, Agent, or Firm* — Cynthia S. Lamon; Lamon Patent Services (57) ABSTRACT

A system for adding decor to a space, the system configured for receiving an input from a user indicative of a space, graphically presenting an item for the space to the user and receiving an input indicating a selection of the item for the space. The system determines whether the item is appropriate for the space, and graphically presents the item graphically modeled in the space to the user.

17 Claims, 7 Drawing Sheets

FIG. 7

AUGMENTED REALITY DECORATING SYSTEM

BACKGROUND

The present invention relates to software and hardware, and more specifically to arranging objects in a space.

Many users determine whether furnishings and decorative items will be attractive in a home space or other type of space. Such determinations may be challenging when a user uses their imagination to visualize objects in a space and measurements to determine whether an object will fit properly in a space.

SUMMARY

Embodiments of the present invention are directed to a method for adding decor to a space, the method comprising receiving an input from a user indicative of a space, graphically presenting an item for the space to the user, receiving an input indicating a selection of the item for the space. The method is further operative to determine whether the item is appropriate for the space, and graphically presenting the item in the space to the user.

A system comprising a display, and a processor communicatively connected to the display, the processor is operative to receive an input from a user indicative of a space, graphically present an item for the space to the user, and receive an input indicating a selection of the item for the space. The system is further operative to determine whether the item is appropriate for the space, and graphically present the item in the space to the user.

A system, method, or non-transitory computer readable medium containing the method instructions for receiving an input from a user indicative of a space, graphically presenting an item for the space to the user, receiving an input indicating a selection of the item for the space, the method further includes determining whether the item is appropriate for the space, and graphically presenting the item in the space to the user.

DETAILED DESCRIPTION

The use of computing devices such as, for example, personal computers, tablets, smartphones, or other similar processing devices has been limited regarding the presentation and purchasing of furnishings and decor. It may be challenging for users to visualize a particular furnishing or decor element in a space, and ensure that the furnishing or decor element fits properly in a given space. Such a space may include an interior or exterior space or room of a home, office, patio, deck, garage, or any other type of living space.

In embodiments described below, the methods and systems include methods for presenting a decor item in a virtualization of a space in scale such that the user is presented with a representation of the object in the space. The user may use this presentation to determine preferable arrangements of decorator items, furniture, or other items, and may provide design and arrangement recommendations as well as opportunities to source and purchase new items.

The disclosed system may include a user interface usable on a mobile device, personal computer, or virtual reality (VR) system that operatively connects with a camera or imaging processor to capture live images of the user environment (e.g., the space), which may include objects in the user environment such as furniture, decorating items, etc., and provide a VR or augmented reality (AR) digital environment with which the user may manipulate digital representations of real-life objects to determine a preferred arrangement.

In other aspects, the system may identify aspects of the space and characterize identified aspects, generate three-dimensional representations of those objects, and provide an easy-to-use interface with which the user may manipulate the object in VR or AR modeling to provide a visual representation of particular arrangements.

The system may also provide an interface that allows the user to browse, purchase, and model new items in their VR or AR environment to determine how a proposed object may look in their own home, office, or other environment.

Before discussing various embodiments in greater detail, an example computing environment is introduced in which embodiments of the present disclosure may operate.

Figure 1:
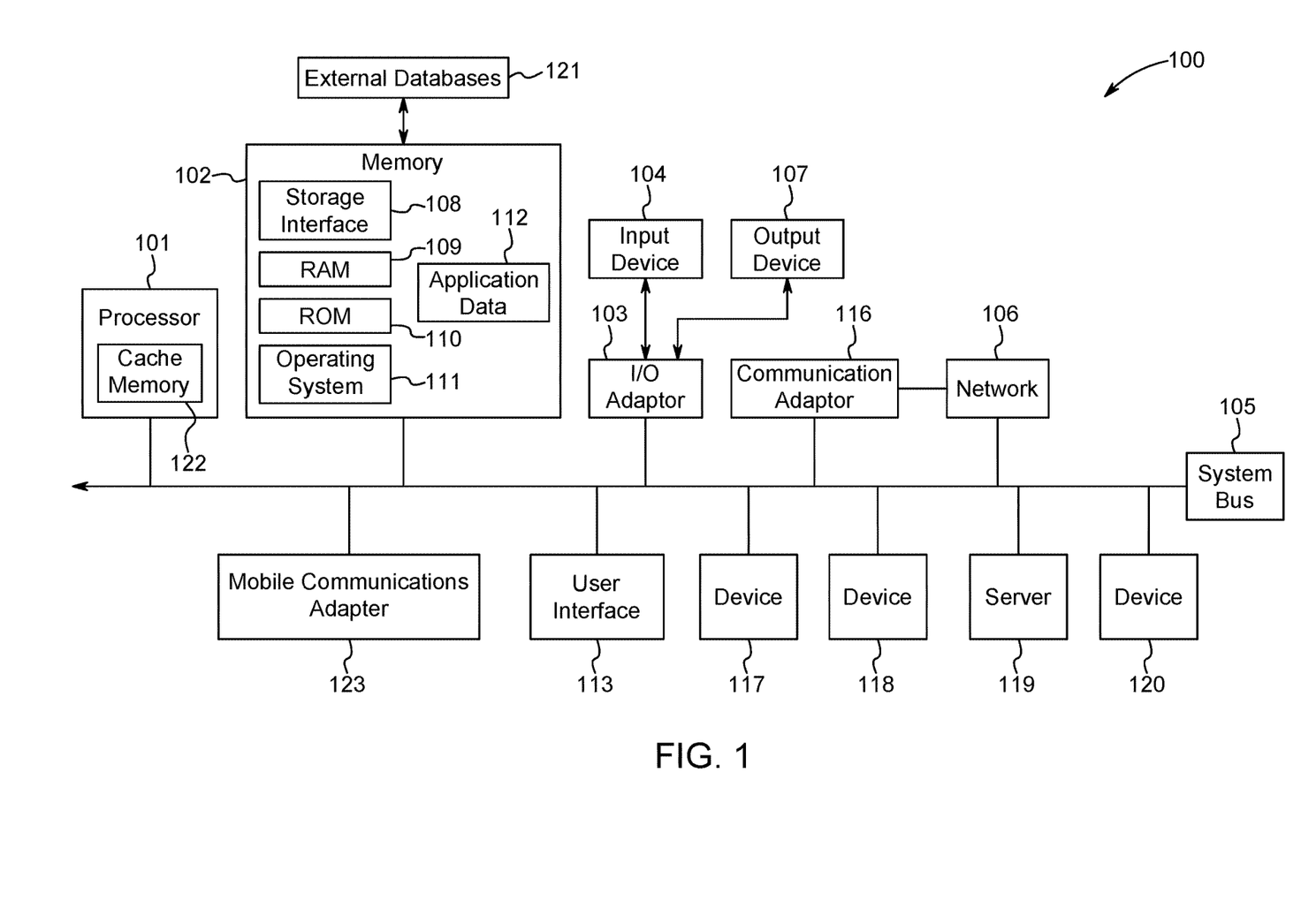
FIG. 1 illustrates a block diagram of an exemplary computing environment and computer system 100 for use in practicing the embodiments described herein.

FIG. 1 illustrates a block diagram of an exemplary computing environment and computer system 100 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 100 therefore can embody a general-purpose computer. In another exemplary embodiment, the implementation can be part of a mobile device, such as, for example, a mobile phone, a personal data assistant (PDA), a tablet computer, etc.

As shown in FIG. 1, the computer 100 includes processor 101. Computer 100 also includes memory 102 communicatively coupled to processor 101, and one or more input/output adapters 103 that can be communicatively coupled via system bus 105. Memory 102 can be communicatively coupled to one or more internal or external memory devices via a storage interface 108. Communications adapter 116 can communicatively connect computer 100 to one or more networks 106. System bus 105 can communicatively connect one or more user interfaces via input/output (I/O) adapter 103. I/O adapter 103 can connect a plurality of input devices 104 to computer 100. Input devices can include, for example, a keyboard, a mouse, a microphone, a sensor, etc. System bus 105 can also communicatively connect one or more output devices 107 via I/O adapter 103. Output device 107 can include, for example, a display, a speaker, a touchscreen, etc.

Processor 101 is a hardware device for executing program instructions (aka software), stored in a computer-readable memory (e.g., memory 102). Processor 101 can be any custom made or commercially available processor, a central processing unit (CPU), a plurality of CPUs, an auxiliary processor among several other processors associated with the computer 100, a semiconductor-based microprocessor (in the form of a microchip or chip set), or generally any device for executing instructions. Processor 101 can include a cache memory 122, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 122 can be organized as a hierarchy of more cache levels (L1, L2, etc.).

Processor 101 can be disposed in communication with one or more memory devices (e.g., RAM 109, ROM 110, one or more external databases 121, etc.) via a storage interface 108. Storage interface 108 can also connect to one or more memory devices including, without limitation, one or more databases 121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

The databases 121 may include one or more local databases (not shown in FIG. 1) or one or more distributed computing databases (not shown in FIG. 1). The databases may store information associated with products, objects, VR/AR environments, user profile information, authentication information, and other data associated with embodiments of the present disclosure.

In other aspects, the databases 121 may store dimensional information, texture information, rendering information, and other data usable to model particular objects associated with uniquely-identified user environments and spaces. For example, the processor 101 may communicate with the databases 121 and retrieve data associated with one or more stored object models representing an object for modeling in the VR/AR environment.

Memory 102 can include random access memory (RAM) 109 and read only memory (ROM) 110. RAM 109 can be any one or combination of volatile memory elements (e.g., DRAM, SRAM, SDRAM, etc.). ROM 110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 can incorporate electronic, magnetic, optical, and/or other types of non-transitory computer-readable storage media. Memory 102 can also be a distributed architecture, where various components are situated remote from one another, but can be accessed by processor 101.

The instructions in memory 102 can include one or more separate programs, each of which can include an ordered listing of computer-executable instructions for implementing logical functions. In the example of FIG. 1, the instructions in memory 102 can include an operating system 111. Operating system 111 can control the execution of other computer programs and provides scheduling, input-output control, file and data management, memory management, and communication control and related services.

The program instructions stored in memory 102 can further include application data 112, and for a user interface 113.

I/O adapter 103 can be, for example but not limited to, one or more buses or other wired or wireless connections. I/O adapter 103 can have additional elements (which are omitted for simplicity) such as controllers, microprocessors, buffers (caches), drivers, repeaters, and receivers, which can work in concert to enable communications. Further, I/O adapter 103 can facilitate address, control, and/or data connections to enable appropriate communications among the aforementioned components.

I/O adapter 103 can further include a display adapter coupled to one or more displays. I/O adapter 103 can be configured to operatively connect one or more input/output (I/O) devices 107 to computer 100. For example, I/O 103 can connect a keyboard and mouse, a touchscreen, a speaker, a haptic output device, or other output device. Output devices 107 can include but are not limited to a printer, a scanner, and/or the like. Other output devices can also be included, although not shown. Finally, the I/O devices connectable to I/O adapter 103 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

In one or more embodiments, the I/O adapter 103 may be integrated as a mobile device such as a smartphone or VR/AR headset or system. In other aspects, the I/O adapter 103 may interface with a camera or image processor associated with a smartphone or other device, and operatively connect with the computer 100. For example, the I/O device 103 may be and/or include a smartphone that may be usable by a user to capture images or video feed of the space, and provide the captured data to the computer 100 via wired or wireless connection. In other aspects, the image capture device may be an external imaging device such as a webcam, digital camera, or other similar device.

According to some embodiments, computer 100 can include a mobile communications adapter 123. Mobile communications adapter 123 can include GPS, cellular, mobile, and/or other communications protocols for wireless communication.

In some embodiments, computer 100 can further include communications adapter 116 for coupling to a network 106.

Network 106 can be an IP-based network for communication between computer 100 and any external device. Network 106 transmits and receives data between computer 100 and devices and/or systems external to computer 100. In an exemplary embodiment, network 106 can be a managed IP network administered by a service provider. Network 106 can be implemented in a wireless fashion, e.g., using wireless protocols and technologies, such as WiFi, WiMax, etc. Network 106 can also be a wired network, e.g., an Ethernet network, an ARINC 429 network, a controller area network (CAN), etc., having any wired connectivity including, e.g., an RS232 connection, R5422 connection, etc. Network 106 can also be a packet-switched network such as a local area network, wide area network, metropolitan area network, Internet network, or other similar type of network environment. The network 106 can be a fixed wireless network, a wireless local area network (LAN), a wireless wide area network (WAN) a personal area network (PAN), a virtual private network (VPN), intranet or other suitable network system.

Network 106 can operatively connect computer 100 to one or more devices including device 117, device 118, and device 120. Network 106 can also connect computer 100 to one or more servers such as, for example, server 119.

If computer 100 is a PC, workstation, laptop, tablet computer and/or the like, the instructions in the memory 102 can further include a basic input output system (BIOS) (omitted for simplicity). The BIOS is a set of routines that initialize and test hardware at startup, start operating system 111, and support the transfer of data among the operatively connected hardware devices. The BIOS is typically stored in ROM 110 so that the BIOS can be executed when computer 100 is activated. When computer 100 is in operation, processor 101 can be configured to execute instructions stored within the memory 102, to communicate data to and from the memory 102, and to generally control operations of the computer 100 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Now considering embodiments of the present disclosure in greater detail, as discussed above, it is desirable for a system to provide a decorating environment or space that identifies a potential decor in a home and model the decor. The system may identify decorative items or objects such as, for example, lamps, furniture, wall hangings that may fit the decorative space and/or achieve a an aesthetic appealable to the user. The system may model the decorative items by placing them in a virtual three dimensional or two-dimensional space, and provide a drag-and-drop user interface that provides a visual representation of objects modeled in the user environment or space.

Figure 2:
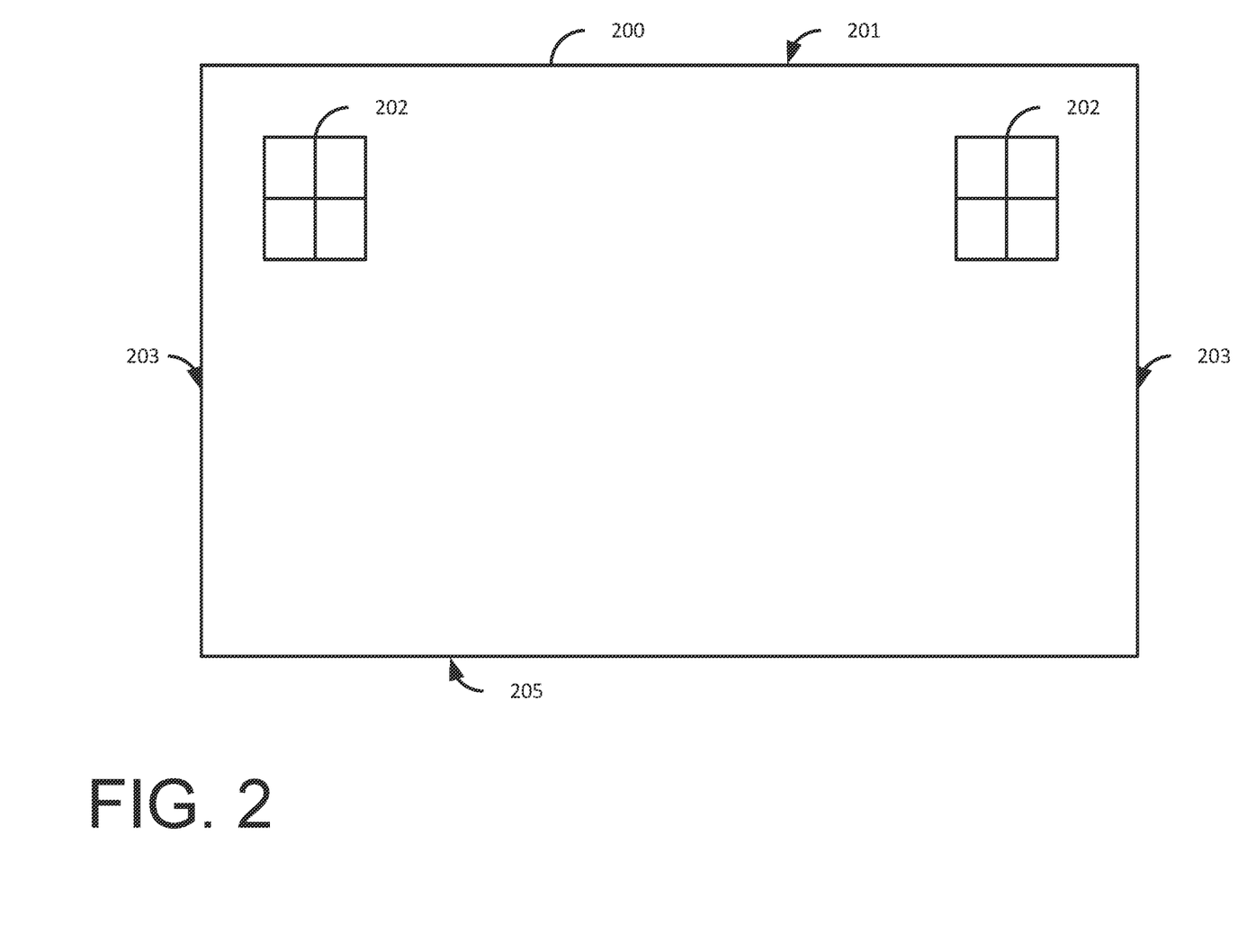
FIG. 2 illustrates a space.

FIG. 2 illustrates an example space 200, in accordance with an embodiment of the present disclosure. The space 200 is illustrated as a portion of a room partially defined by a celling 201, a plurality of sides 203, and a floor 205. The space 200 can further include one or more windows 202. Though a single space in a residential environment is shown, any number and types of spaces may be depicted to a user.

In one aspect, the system 100 may receive an image from a user and store the image is stored to an operatively connected computer-readable memory. The image may be parsed using an image processing module, and characterized to determine a number of factors such as, for example, the item type, item color, approximate size of the item, information about the manufacturer of the item, and the type of room the item may be used in. The item characteristics may be saved in memory. The item may be recommended based on the human-machine interface. An output may be generated showing the item in the space.

In operation, the user may enter dimensions of the space into an application on a processing device. The user may enter fixtures in the space such as, for example windows and doors. In embodiments the system 100 may use an image of the space to determine the measurements and specifications of the space 200. In one example embodiment, the system may receive an image or series of images indicative of a measurable distance or dimension, and generate user output requesting that the user measure the distance or dimension and input the information. The system may utilize the dimensional input from the user to scale one or more other objects in the image by identifying coplanar distances and extrapolating respective measurements. In other aspects, the system may receive an image, request that the user perform a plurality of measurements indicative of respective dimensions in the frame and utilize the plurality of measurements to verify or scale object measurements that are not coplanar.

In one or more embodiments, the system 100 may receive one or more images, videos, or product information via the mobile device, connected camera system, or other input mechanisms, and apply one or more machine learning algorithms to evaluate the image or images, product information, or other input data, characterize the information using a trained neural network or supervised machine learning algorithm or algorithms, and provide recommendations for arranging one or more objects, provide one or more recommendations for purchase of new objects, and/or provide recommendations for adding or removing potential objects.

For example, in one aspect of the present disclosure the machine learning algorithm may be an unsupervised neural network that evaluates image and other data associated with household goods, furniture, office items, artwork, etc., and characterize the available object data into unique and interesting configurations that may fit in a particular space such as on a desktop. Accordingly, the machine learning system may identify a surface from an input image provided to the system, and using a neural network algorithm 1) characterize a shape from the input image to determine that a surface corresponds to a desktop in the user's space, 2) determine an approximate dimension or dimensions of the desktop, 3) determine one or more objects on hand (e.g., owned by the user) that may be arrangeable on the desktop in an aesthetically pleasing fashion, 3) provide one or more recommendations for an arrangement of the existing items, and 5) generate one or more output messages, mockups or virtual reality designs, or provide other information that allows the user to see the recommended arrangement and create a similar real-life decorating scenario based on the output message.

In another embodiment, the system 100 may use the neural network to provide recommendations for purchase of new furniture that compliments a common design thread identified in other objects on hand and in possession of the user. For example, the user may take photographs of their available belongings to be usable for decorating, and the machine learning algorithm may catalogue the items and generate one or more datasets that identify common design elements among the input data of objects on hand. For example, of 50 items photographed, the system may determine that 20 of said objects share a common design thread of vertical stripes, and ten of the objects contain common design elements comprising floral patterns having red and blue coloring. In one embodiment, the machine learning algorithm may include a trained database of floral and striped design layouts for aesthetically pleasing home and office decorator photographs, determine that one or more of the common design elements of the photographed inventory on hand are mappable to identified design elements of the decorator photos, and generate a decorating recommendation based on the identified common threads of design elements.

In another aspect, the machine learning system may provide complementary object recommendations that may be purchasable by the user to accentuate the design plan. For example, with a design plan having a theme of floral accents and vertical stripes, the system may determine that a solid color object having a striking but complementary color scheme may balance an otherwise busy arrangement of objects. For example, a large tan sofa may compliment other patterns and layouts of objects having strikingly bright colors and patterns. Other examples are possible and such examples are contemplated.

The representation of the space may be generated in two dimensions, three dimensions, or may be presented as a virtual space using virtualization hardware and displays. For example, a space may be shown on a screen or on virtualization displays such as virtual goggles.

The representation of the space may also include, for example, a photograph or image of the space that may be presented to the user. For example, the processor 101 may determine that the user has taken an image of the space that may be used to determine, in embodiments, the dimensions of the space as described above. The image of the space may also be used to identify colors or other design elements in the space. For example, if a space has a particular color in the space such as wall color, recommendations may include items with colors that aesthetically look appropriate for the space. The image of the space or room may be used to present a three-dimensional representation of the space.

Alternatively, in embodiments the system 100 (of FIG. 1) may receive a video or computer aided design file that represents the space and the contents in the space 200.

Figure 3:
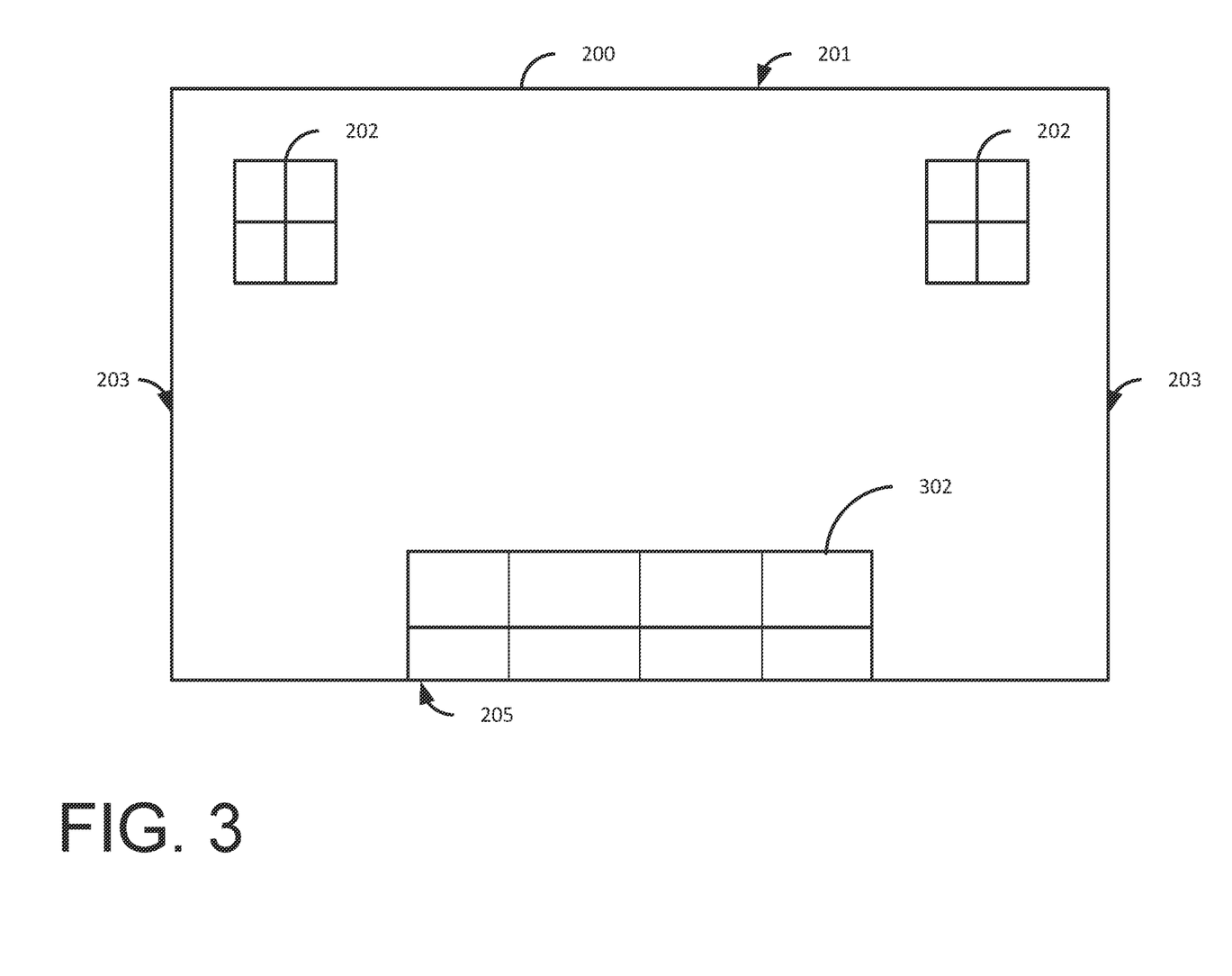
FIG. 3 illustrates a graphical example of the space.

FIG. 3 illustrates a graphical example of the space 200 that has a sofa 302 arranged on the floor 205 of the space 200. The sofa has dimensions (length, width, height) that allow the sofa 302 to fit in the space 200. The dimensions of the sofa, may be determined by an input from the user indicating the dimensions or manufacture specifications. If the sofa 302 has dimensions that are respectively larger than the space or larger than a user desires, a warning may be presented to the user informing them that the sofa 302 may be too large for the given space 200. During the selection process, the user may further define the sofa 302 to have a desired size or dimensions, shape, color, style, pattern, or fabric. In some embodiments a color of the sofa may be identified that will aesthetically match the space 200.

According to another example embodiment, the machine learning algorithm may identify and/or recommend objects that take advantage of unique room, desk, furniture, or other dimensions by providing an arrangement scheme that uses available space in unique, efficient, visually striking, or other ways.

Figure 4:
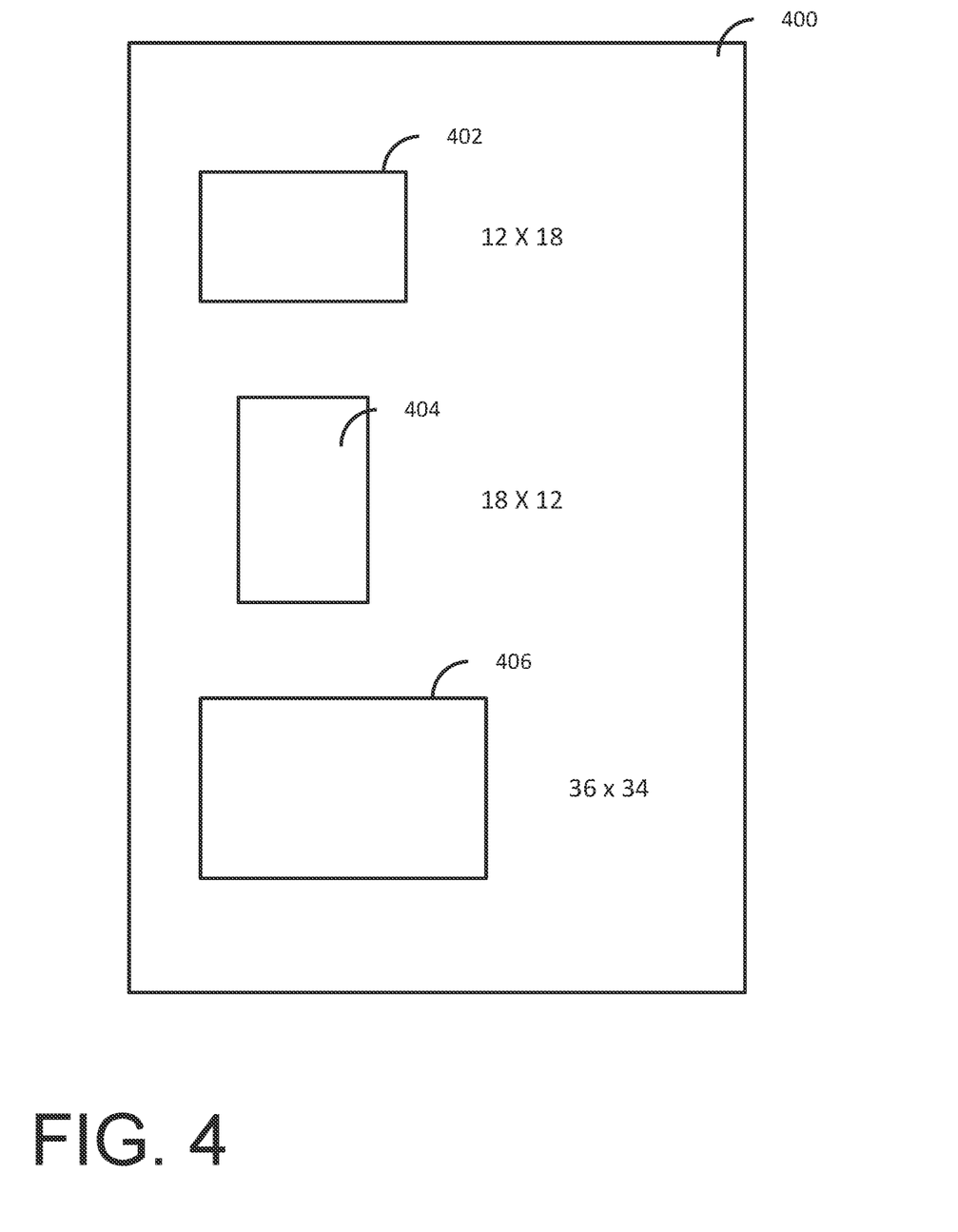
FIG. 4 illustrates a graphical user interface.

FIG. 4 illustrates a graphical user interface 400 showing a selection of frames in various sizes 402, 404, 406 such as, for example, picture frames, television bezels, or mirror frames that may be selected by the user and added to the space 200. Though the illustrated example provides sizes of the frames 402, 404, and 406, a user may define a frame having any desired size or shape.

According to another environment, the processor may recognize a set of items having particular dimensions, such as a set of picture frames, and output one or more predetermined configurations for arrangement. For example, the system may identify a set of five picture frames in a data structure (e.g., the databases 121) cataloguing various items associated with the user and available items for arrangement. The system may determine by characterizing the content of each picture respectively, such as all portraits of people, determine that the colors of some or all of the picture frames are complementary, and generate a proposed layout or multitude of layouts providing an aesthetically pleasing arrangement.

In one aspect, the system may generate an interface showing one or more proposed arrangements for the set of complementary photos/frames in the databases 121, and receive a user selection of the proposed arrangement. Responsive to the user selection, the system may display the set or subset of picture frames overlaid on the virtual reality model of a wall or other space, where the user may see the proposed layout or arrangement of the photographs.

In another aspect the system may provide a user-selectable link to model a second layout, a third layout, etc., and receive a user indication of the preferred layout. The processor may update a data structure (not shown in FIG. 2) indicative of a current scene to include the chosen layout, and provide an interface allowing the user to arrange or consider one or more additional items from the databases 121 and continue building the VR/IR scene of their space.

Figure 5:
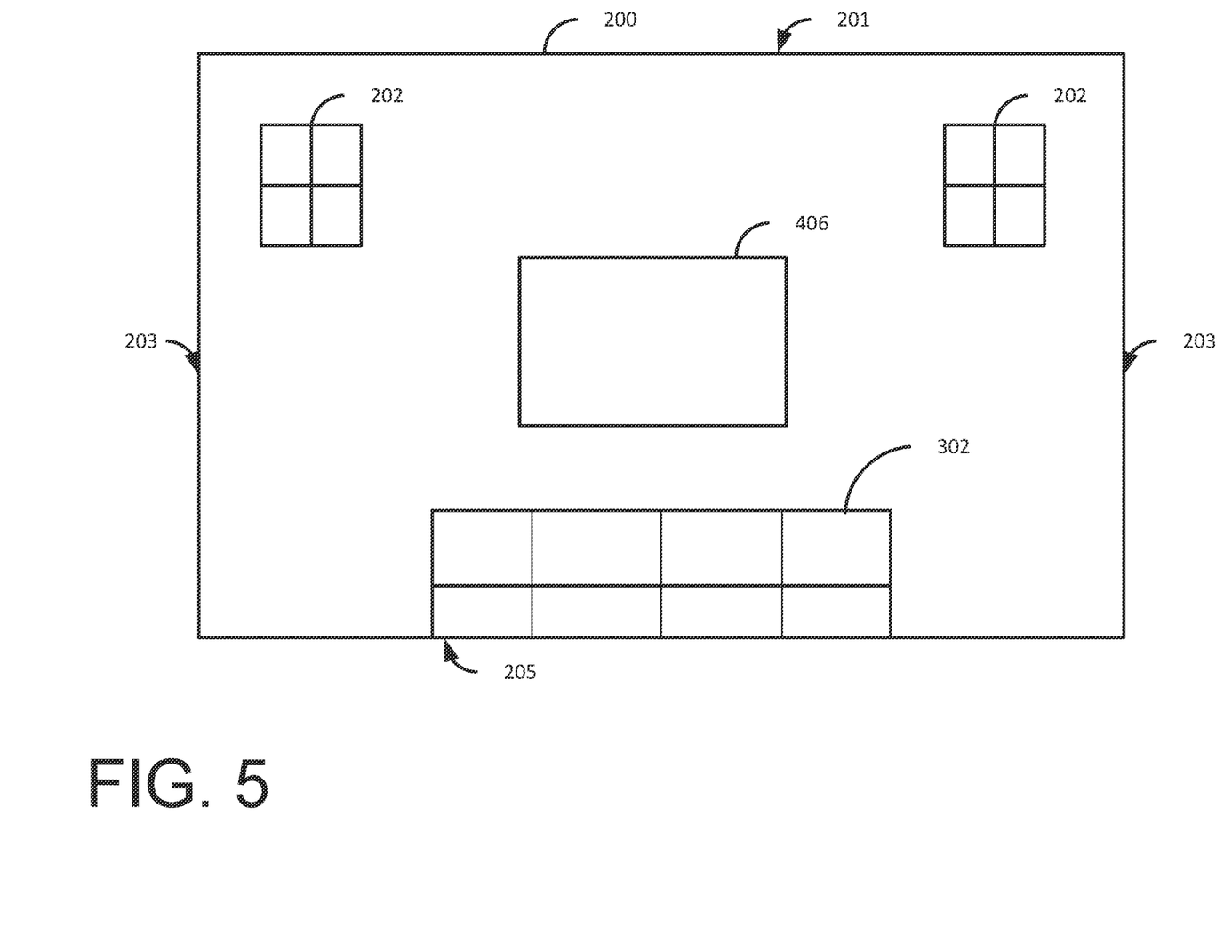
FIG. 5 illustrates an example of the space.

FIG. 5 illustrates an example of the space 200 after the user has selected the frame 406 in the interface 400. Thus, in this example, the sofa 302 and the frame 406 are visually represented in the space 200. In embodiments, the frame 406 may be shown having any suitable color, finish, or design. The frame may also partially represent a boarder of an image such as, for example, a painting or photographic image. Such image may be changed and selected by the user.

The sofa 302 may be populated with any type of fabric, color, or design. Such a population may be made when the user selects the sofa 302 in a graphical user interface or while the sofa 302 is arranged in the space 200.

Figure 6:
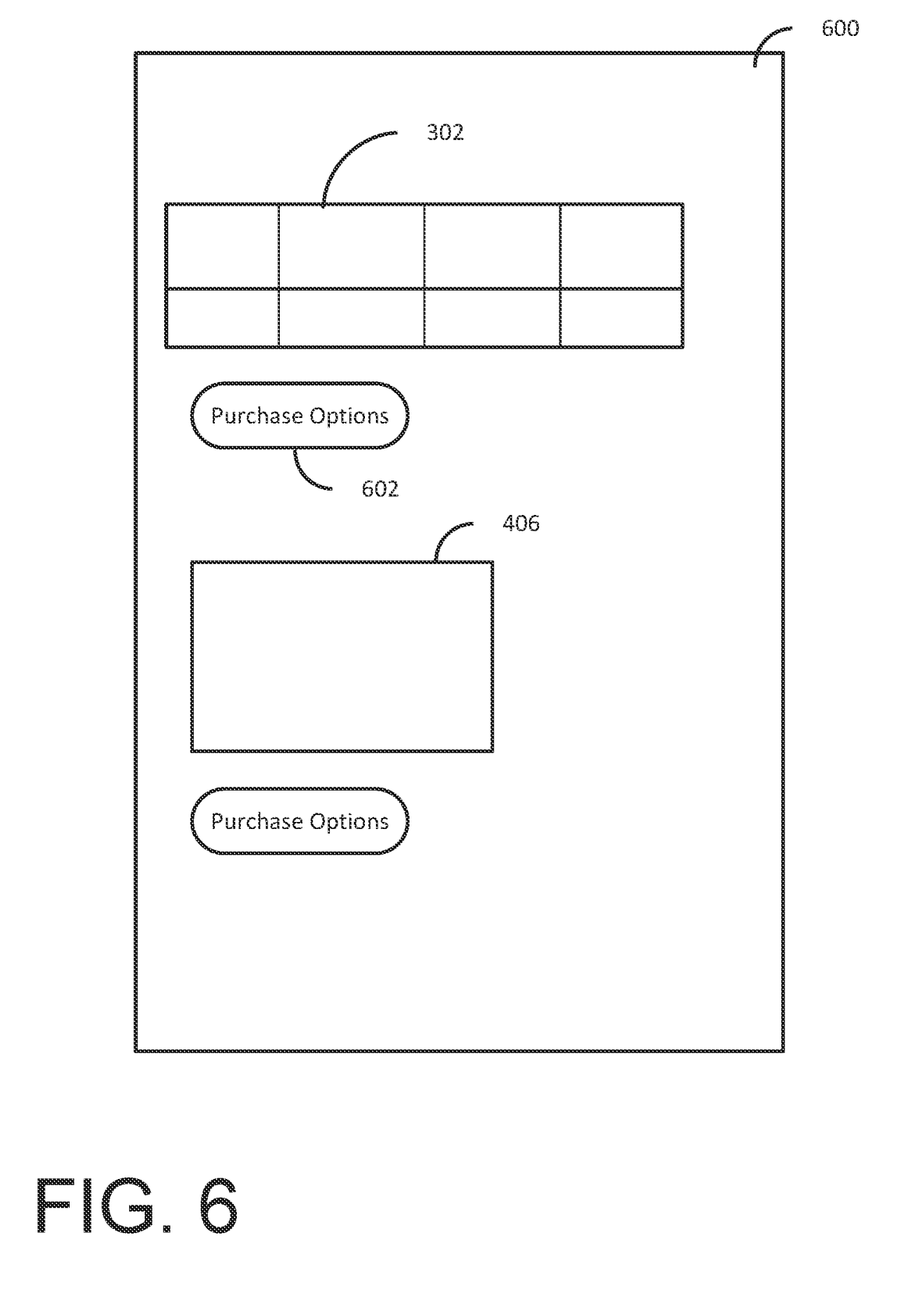
FIG. 6 illustrates a graphical user interface.

FIG. 6 illustrates a graphical user interface 600 that includes the sofa 302 and the frame 406. In this regard, the system 100 may present the items that the user has placed in the space 200 (of FIG. 2). In embodiments, the presentation may include options 602 to purchase items in the presentation by, for example, providing links to retailers of the item. This presentation may be graphical showing images representing the items or may be textual. The user may be presented with a selection button or a link that presents purchase options to the user for a particular item. For example, a user may desire to purchase the sofa 302 and may press the purchase options button. The user is presented with buying options regarding the item such as a connection to a retailer that stocks the item, styles, price, availability from retailers, sizes, and colors, or patterns that are available for the sofa 302.

The user may buy an item online by receiving suggestions and prices from retailers that can provide the items to the user. The system 100 may provide Internet links to items at online retailers. The system 100 may also allow a user to select items using, for example, check boxes to buy items. In such an embodiment if an item is displayed in the room 200 a user may select a replacement item that may then be replace the previous item in the room. For example, if the user selects another sofa, the sofa 302 in the room 200 may be removed and replaced with the user's selected sofa.

In this regard, the user may input a zip code or other geographical reference to determine whether the item is available for shipment, shipping price, the price of the item, options for colors or fabrics. Such an interface may in some instances, remove items that are not in stock from the list of available purchase options. The selections of the user may be saved by the system 100 so that they may be retrieved by the user. The user may also direct the system 100 to email or print descriptions and buying options for the buyer in a hard copy.

Figure 7:
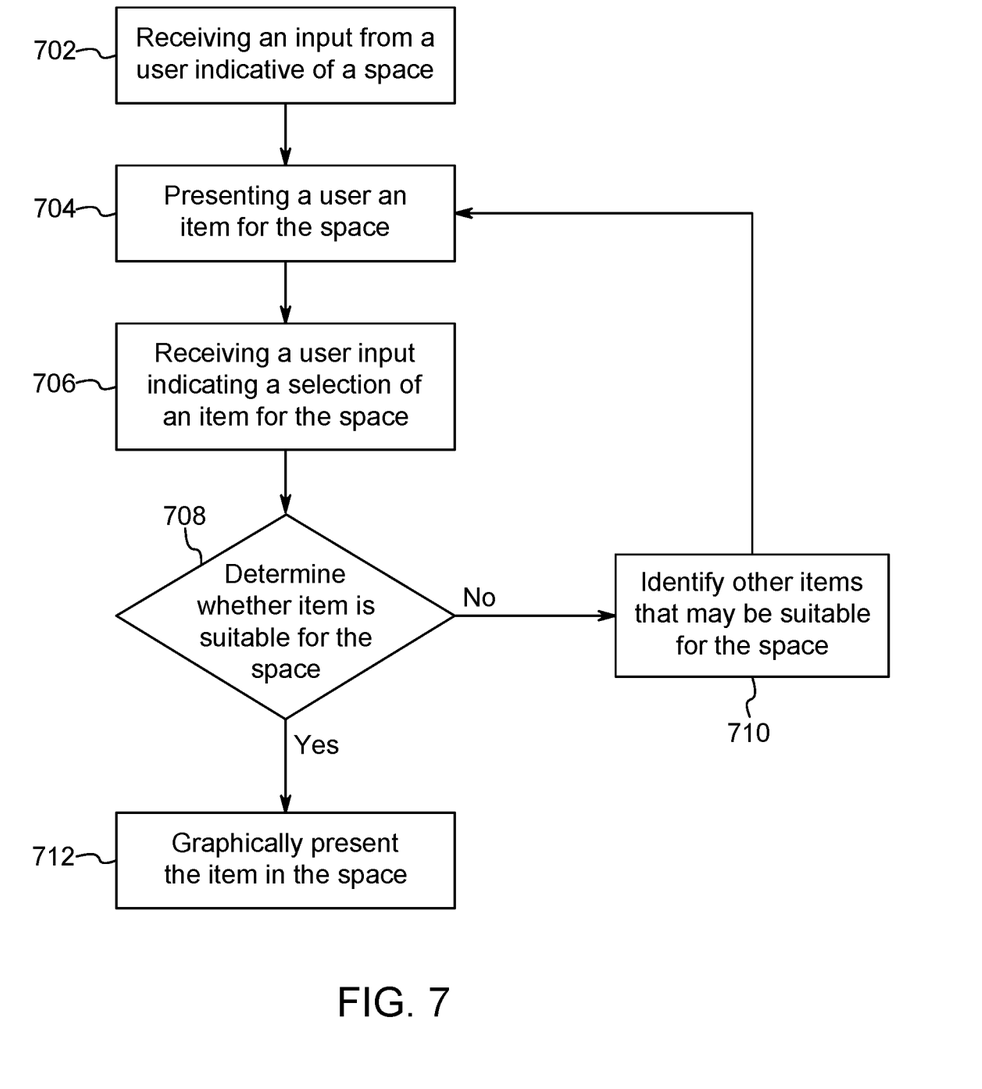
FIG. 7 illustrates a block diagram.

FIG. 7 illustrates a block diagram 700 that shows a method of operation of the system 100 (of FIG. 1). In this regard, in block 702 an input from a user indicative of a space is received. Such an input may include, for example, dimensions of the space entered by the user, or the dimensions of the space may be determined by the system 100 using an image or other inputs that may include, for example, sensors. In block 704 an item is presented to the user for the space. The item may be graphically presented to the user such as, for example, an image of the item. In block 706 a user input is received that indicates a selection by the user of an item for the space. In this regard, the user may select an image or a textual description of the item. The system 100 or the user may determine whether an item is suitable for the space in block 708. In this regard, the system 100 may determine that the item will not fit the dimensions of the space. Other considerations may include, for example, a fabric, pattern, or color pallet desired for the space. If no, the system 100 may identify other items that may be suitable for the space in block 710. If yes, in block 712 the item is graphically represented to the user in the space. Once the item is displayed to the user in the space, the user may change colors, fabrics, and patterns associated with the item to determine whether the item appeals to the user in the space.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adding decor to a space, the method comprising:
   receiving, by a processor, an input from a user indicative of a space, wherein the input from the user indicative of the space comprises a graphical image of the space, including identifying at least dimensions of the space;
   identifying, by the processor, a set of items for a home or office in the graphical image of the space responsive to receiving the input;
   characterizing, by the processor, metrics of each item in the graphical image, said metrics including at least dimensions and colors;
   generating, by the processor, a plurality of layouts of the set of items based on the characterization of the metrics of the items;
   graphically presenting, by the processor, the plurality of layouts in the space to the user including second items not input by the user, and independently sourced by the processor;
   receiving, by the processor, an input indicating a selection of a layout from the plurality of layouts for the space; and
   graphically presenting, by the processor, the layout in the space to the user including the second items having matching dimensions or colors.

2. The method of claim 1, wherein the input from the user that is indicative of the space includes a first color.

3. The method of claim 1 further comprising graphically presenting the second item for the space to the user, wherein the graphically presenting the second item for the space to the user includes graphically presenting a piece of furniture available for purchase by the user in the space.

4. The method of claim 3, wherein the graphically presenting the second item for the space includes a choice to user of color, pattern, and fabric type of the item.

5. The method of claim 3 further comprising determining whether the second item is appropriate for the space, wherein determining whether the item is appropriate for the space is a function of a dimension of the item and a dimension of the space.

6. The method of claim 3, further comprising presenting a buying option to the user that facilitates the purchase of the second item.

7. The method of claim 1 further comprising:
   identifying a first set of objects having a first common design and a second set of objects having a second common design in the space responsive to obtaining the input, wherein the first common design and the second common design are different;
   generating a recommendation based on the identification of the first common design and the second common design, wherein the recommendation comprises placement of another item in the space matching a design of one or both of the first and second set of objects; and
   graphically presenting the other item in the space and facilitating a purchase for the user of that other item from a retailer.

8. A system comprising:
   a display;
   a processor communicatively connected to the display, the processor is operative to:
   receive an input from a user indicative of a space, wherein the input from the user indicative of the space comprises a graphical image of the space including identifying at least dimensions of the space;
   identify a set of first items in the graphical image of the space responsive to receiving the input;
   identifying metrics of each item in the graphical image, the metrics including at least dimensions and colors;
   suggesting second items having matching dimensions and colors of the first items;
   generate a plurality of layouts of the set of first and second items based on the characterization of the metrics of the first items;
   graphically present the plurality of layouts in the space to the user;
   receive an input indicating a selection of a layout from the plurality of layouts for the space; and
   graphically present the layout in the space to the user.

9. The system of claim 8, wherein the input from the user that is indicative of the space includes a first color.

10. The system of claim 8, wherein the processor is further operative to graphically present the second item for the space to the user, and wherein the graphically presenting the item for the space to the user includes graphically presenting a piece of furniture selected by the user in the space.

11. The system of claim 10, wherein the graphically presenting the second item for the space includes a choice to the user of color, pattern, and fabric type of the second item.

12. The system of claim 10, wherein the processor is further operative to determine whether the item is appropriate for the space, wherein the determining whether the item is appropriate for the space is a function of a dimension of the item, color and a dimension and color of the space.

13. The system of claim 10, wherein the processor is further operative to present a buying option to the user that facilitates the purchase of the second item.

14. A method comprising:
   receiving, by a processor, a first input from a user indicative of a plurality of existing first objects;
   characterizing, by the processor, the plurality of existing first objects;
   storing, by the processor, characterization of the plurality of existing first objects;
   receiving, by the processor, a second input from the user indicative of a space, wherein the second input from the user indicative of the space comprises a graphical image of the space including identifying at least dimensions of the space;
   characterizing, by the processor, a second object in the graphical image of the space;
   providing, by the processor, a recommendation to decorate the space using the plurality of existing first objects, wherein the recommendation is based on the characterization of the plurality of existing first objects and the second object; and
   outputting, by the processor, the recommendation to the user along with purchase options for the second object for the user from a retailer.

15. The method of claim 14, wherein characterizing the plurality of existing first objects comprises determining object type, object color, object pattern, object design, object size, and information about manufacturers of the plurality of existing first objects.

16. The method of claim 14 further comprising:
- identifying a new item that is appropriate for the space based on the characterization of the second object, wherein the characterization is based on a fabric, a pattern, or a color pallet associated with the second object; and
- graphically presenting the new item in the space along with purchase options for the second object for the user from a retailer.

17. The method of claim 16, wherein the new item comprises a furniture or decorative item.

* * * * *